J. SPEAR.
Ash Sifting Pan for Stoves.
No. 2,305.
Reissued July 10, 1866.
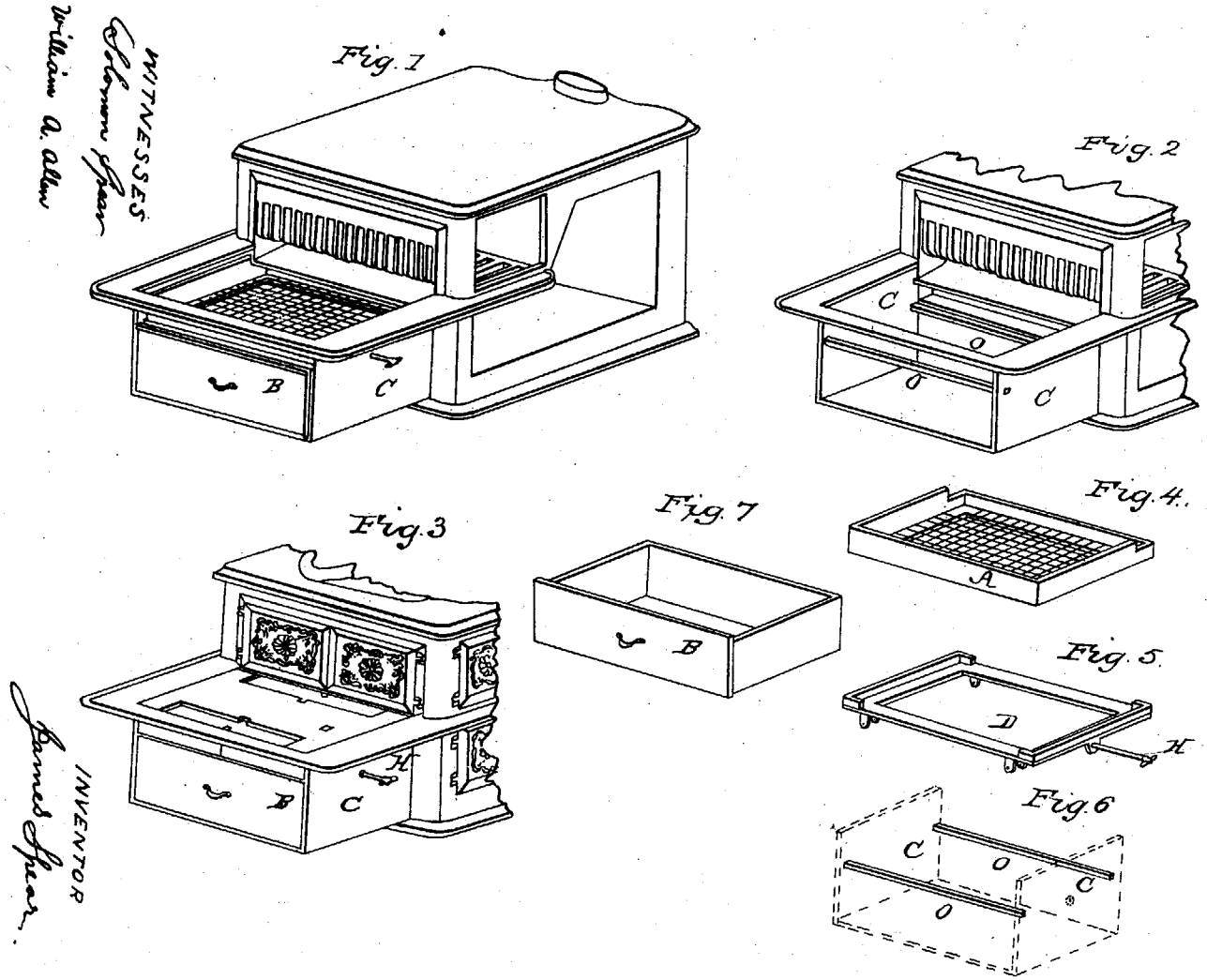
N. PETERS, Photo-Lithographer, Washington, D. C.

UNITED STATES PATENT OFFICE.

JAMES SPEAR, OF PHILADELPHIA, PENNSYLVANIA.

ASH-SIFTING PAN FOR STOVES.

Specification forming part of Letters Patent No. 34,990, dated April 15, 1862; Reissue No. 2,305, dated July 10, 1866.

*To all whom it may concern:*

Be it known that I, JAMES SPEAR, of the city and county of Philadelphia, and State of Pennsylvania, have invented a new and useful Improvement in Ash-Sifters for Stoves and Ranges, of which the following is a specification.

The trouble heretofore experienced in removing the ashes and unburnt coal from stoves was that after the fire had been raked the ashes and coal drawn into the ash-pit had to be taken up with a shovel into a bucket or other vessel and removed together, at the same time causing a great deal of dust and dirt in the room. The ashes and unburnt coal removed in this manner had to be sifted, or a large amount of fuel would be wasted, and the operation of sifting ashes has always been disagreeable.

Again, the sifting-grates heretofore used have been simply flat grates laid in the sunk part of the hearth, and the ashes had to be worked through the grate with a poker, and as the hearth-plate had to be removed while this was done a great deal of dust was made in the room, and when the unburnt coal and ashes were removed with a shovel the annoyance was so great that of late years they have been generally abandoned.

The object of my invention is the finding of a ready means of sifting the unburnt coal, after it has been drawn from the fire-chamber and before it has been removed from the stove, without causing dust in the room, and also an easy manner of removing the sifted coal and ashes from the stove without causing dust after the operation of sifting has been performed.

To accomplish this object I have constructed the hearth of a stove so as to admit a sifting-pan capable of being vibrated with an ash-pan underneath it, and I have inclosed the space in which the sifting-pan moves so tight that no dust or ashes can escape into the room.

Take any stove with an elevated hearth and remove the bottom of the hearth or ash-pit, and in place thereof attach the box C to the under side of the hearth, as is shown in Figs. 1, 2, and 3. In this box place two horizontal bars, O O, Figs. 2 and 6. On these bars place the carrier D, Fig. 5, and on this carrier place the sifting-pan A with the ash-drawer B underneath it, as is shown in Fig. 1.

Fig. 4 represents the sifting-pan, which is constructed of sheet or cast iron, with a grate-bottom of wire net-work attached to it; Fig. 7, the ash-drawer, which is also constructed of sheet or cast-iron.

Fig. 3 represents the box closed, with the ash-drawer and sifting-pan in its place, with the handle H projecting through the side of the box. By moving the handle rapidly back and forth the process of sifting is performed without causing any dust in the room. This sifting-pan may be constructed with flanges attached to it resting on bars or on lugs on the side of the box, and be supplied with a handle and shaken in the same manner.

I am aware that a flat cast-iron grate has been used in stoves and heaters and which was set in a frame and supported by ways and moved by means of a lever, rack, and pinion. This plan is very objectionable, as the weight of coal and ashes resting on the grate must work through the openings and become wedged between the grate and the frame, which impedes or stops the motion of the grate, and if much force were applied to it by means of the lever would break it; but by the use of my sifting-pan I overcome all these objections, for in my improvement it is not the grate at the bottom which is moved, but the whole sifting-pan, with its contents, is shaken without any danger of its motion being impeded or clogged, and should pieces of coal become wedged in the meshes of the sieve no damage can result from that. Consequently it is not liable to get out of order, and it is more simple and more easily constructed.

I do not confine myself to any particular mechanical device for moving the sifting-pan with its contents.

Having thus fully described my invention, I claim—

The application of a sifting-pan capable of being vibrated to the hearth of a stove or range, substantially in the manner and for the purpose herein described.

JAMES SPEAR.

Witnesses:
GEO. W. FOX,
ALFRED WERMOUTH.